US010277586B1

(12) United States Patent
Yau et al.

(10) Patent No.: US 10,277,586 B1
(45) Date of Patent: Apr. 30, 2019

(54) MOBILE AUTHENTICATION WITH URL-REDIRECT

(71) Applicant: Syniverse Technologies, LLC, Tampa, FL (US)

(72) Inventors: Edward Yau, Tseung Kwan O (HK); Huiyue Xu, Tampa, FL (US); Paul Sun, Tokwawan (HK); Prashant Datar, Tampa, FL (US); Ravi Tandon, Sandweiler (LU)

(73) Assignee: Syniverse Technologies, LLC, Tampa, FL (US)

( * ) Notice: Subject to any disclaimer, the term of this patent is extended or adjusted under 35 U.S.C. 154(b) by 0 days.

(21) Appl. No.: 16/173,860

(22) Filed: Oct. 29, 2018

(51) Int. Cl.
*G06F 9/54* (2006.01)
*H04L 29/06* (2006.01)
*H04W 12/06* (2009.01)
*H04L 9/08* (2006.01)
*H04W 12/04* (2009.01)
*H04L 29/08* (2006.01)
(Continued)

(52) U.S. Cl.
CPC ........ *H04L 63/0838* (2013.01); *H04L 9/0863* (2013.01); *H04L 61/2592* (2013.01); *H04L 67/146* (2013.01); *H04W 12/04* (2013.01); *H04W 12/06* (2013.01); *G06F 9/541* (2013.01); *H04L 47/193* (2013.01)

(58) Field of Classification Search
CPC ............... H04L 63/0838; H04L 9/0863; H04L 61/2592; H04L 67/146; H04L 47/193; H04W 12/04; H04W 12/06; G06F 9/541
USPC .......................................................... 726/10
See application file for complete search history.

(56) References Cited

U.S. PATENT DOCUMENTS 7,954,141 B2 * 5/2011 De Lutiis .......... H04L 29/12216
706/10
8,489,071 B2 * 7/2013 Mechaley, Jr. ......... H04L 63/18
455/411
(Continued)

FOREIGN PATENT DOCUMENTS

CA       2856801 A1 *  5/2013  ........... G06F 21/313
CA       3002280 A1 * 11/2018  ........... H04W 12/04
(Continued)

OTHER PUBLICATIONS

16173860_Thesis (Year: 2018).*
English translation of KR20120100872A.

*Primary Examiner* — David J Pearson
*Assistant Examiner* — Badri Narayanan Champakesan
(74) *Attorney, Agent, or Firm* — Anton J. Hopen; Smith & Hopen, P.A.

(57) ABSTRACT

This invention is a system and method for mobile authentication using HTTP redirect in GTP tunnels. The authentication procedure generates a one-time-token that returns to the Enterprise application that requests the authentication. The authentication platform injects a HTTP redirect response to the mobile device via the GTP-U tunnel that corresponds to the GTP session of the inputted-MSISDN. The HTTP redirect response carries a URL with the one-time-token as parameter. The Enterprise application authenticates the HTTP request by comparing the one-time-token in the HTTP request parameter against the value returned by the authentication platform during its authentication request API call.

20 Claims, 6 Drawing Sheets

(51) Int. Cl.
  *H04L 29/12* (2006.01)
  *H04L 12/801* (2013.01)

(56) References Cited

U.S. PATENT DOCUMENTS

| | | | | |
|---|---|---|---|---|
| 8,577,336 | B2* | 11/2013 | Mechaley, Jr. | G06Q 20/027 |
| | | | | 455/411 |
| 9,264,898 | B2* | 2/2016 | Schroeder | H04W 12/06 |
| 9,438,699 | B1* | 9/2016 | Shetty | H04L 29/06 |
| 9,762,498 | B2* | 9/2017 | Zhang | H04L 47/12 |
| 2012/0144202 | A1* | 6/2012 | Counterman | G06F 21/335 |
| | | | | 713/176 |
| 2012/0264427 | A1* | 10/2012 | Adatia | H04W 4/14 |
| | | | | 455/435.1 |
| 2015/0088753 | A1* | 3/2015 | Van Der Schueren | |
| | | | | G06Q 20/351 |
| | | | | 705/67 |
| 2015/0382240 | A1* | 12/2015 | Hecht | H04L 69/22 |
| | | | | 370/316 |
| 2016/0057607 | A1* | 2/2016 | Dubesset | H04W 8/12 |
| | | | | 455/433 |
| 2016/0057789 | A1* | 2/2016 | Gumbrell | H04W 8/26 |
| | | | | 455/435.1 |
| 2016/0174107 | A1* | 6/2016 | Kanugovi | H04L 12/28 |
| | | | | 370/236 |
| 2016/0295544 | A1* | 10/2016 | Jiang | H04L 5/0053 |
| 2016/0380997 | A1* | 12/2016 | Blasi | G06F 21/43 |
| | | | | 726/9 |
| 2017/0124313 | A1* | 5/2017 | Mann | G06F 21/32 |
| 2018/0005493 | A1* | 1/2018 | Basu | G07F 19/203 |
| 2018/0343562 | A1* | 11/2018 | Nalukurthy | H04W 12/04 |

FOREIGN PATENT DOCUMENTS

| | | | | | |
|---|---|---|---|---|---|
| CN | 104410516 | A | * | 3/2015 | |
| CN | 104918245 | A | * | 9/2015 | |
| CN | 105025044 | A | * | 11/2015 | |
| CN | 105142141 | A | * | 12/2015 | |
| CN | 108462962 | A | * | 8/2018 | |
| EP | 2658301 | A1 | * | 10/2013 | ............ H04W 12/06 |
| EP | 2932676 | A1 | * | 10/2015 | ......... H04L 63/1466 |
| EP | 3386165 | A1 | * | 10/2018 | ........... H04Q 3/0025 |
| KR | 20120100872 | A | | 8/2012 | |
| WO | WO-2009071735 | A1 | * | 6/2009 | ........... H04W 12/12 |
| WO | WO-2017109652 | A1 | * | 6/2017 | ........... H04W 12/06 |

* cited by examiner

MOBILE AUTHENTICATION WITH URL-REDIRECT

BACKGROUND OF THE INVENTION

1. Field of the Invention

This invention relates generally to the field of IP and telecommunications networks, specifically to the mobile authentication for Internet applications. More specifically, it relates to methods and systems of performing mobile user authentication using URL redirect in GTP tunnels of mobile data networks.

2. Brief Description of the Related Art

Universal Resource Locator (URL) Redirect is a scheme defined in IETF RFC1945 (Hypertext Transfer Protocol—HTTP/1.0) and RFC2616 (Hypertext Transfer Protocol—HTTP/1.1) to redirect a HTTP client (such as internet browser) to a specified location using a response code of '3xx'. Common examples of such response codes are '301 Moved Permanently', '302 Found/Moved Temporarily' and '304 Not Modified'.

GPRS Tunneling Protocol (GTP) is a protocol defined in $3^{rd}$ Generation Partnership Project (3GPP) TS 29.060 (3rd Generation Partnership Project; Technical Specification Group Core Network and Terminals; General Packet Radio Service (GPRS); GPRS Tunneling Protocol (GTP) across the Gn and Gp interface). It is used to carry mobile data traffic between Serving GPRS Support Node (SGSN) and Gateway GPRS Support Node (GGSN) in 2.5G/3G networks, and between Serving Gateway (SGW) and Packet Data Network Gateway (PGW) in LTE networks.

In many mobile applications, a user is required to enter his/her mobile phone number for identification purposes. Mobile authentication is a scheme to verify the authenticity of Mobile Subscriber International ISDN number (MSISDN), commonly known as 'mobile phone number'. This is used to prevent user from entering a phone number which does not belong to him/her (impersonation).

Traditional mobile authentication is performed by sending a Short Message Service (SMS) message that carries an One-Time-Password (OTP) to the inputted MSISDN (which the user claims to be the MSISDN of his mobile device). The mobile user then reads the OTP and enters the password in the mobile application (or web page) to authenticate the MSISDN. In some cases, the mobile application can capture the OTP in the SMS and this process would become automatic.

This traditional approach of using SMS OTP to perform mobile authentication has a major risk that the delivery of SMS is not done securely. SMS delivery is now known to be subject to intercept, spoofing and faking, which may defeat the purpose and effect of mobile authentication. For example, a hacker may impersonate another user by entering his MSISDN when visiting an enterprise application. If the hacking can intercept or redirect the SMS message, he can obtain the OTP, and use it to complete the authentication process. This entire process does not require any action at victim's phone and very often victim is not aware of the attack.

This invention discloses the methods and systems to perform mobile authentication in a secure way using HTTP Redirect in GTP tunnels of mobile networks.

BRIEF SUMMARY OF THE INVENTION

This invention consists of networking and application systems that 1) provides an Application Programming Interface (API) for enterprise applications to authenticate MSISDN, 2) generates a one-time token for enterprise applications to perform authentication, 3) captures and stores mobile device GTP session information which includes Packet Data Protocol (PDP) context information, and 4) injects a HTTP-302 response packet at the GTP-U (GTP User plane) tunnel to redirect mobile device clients or browsers to a designated authentication page at the enterprise application, carrying the one-time token for authentication.

The mobile authentication platform provides an API for enterprise applications to perform MSISDN authentication. After the user enters a MSISDN on the enterprise web page, or after the user enters a MSISDN on his mobile device with an application that sends a HTTP request to the enterprise application, the enterprise application sends the MSISDN that the user inputted to the mobile authentication platform via an authentication API. The mobile authentication platform then generates a one-time token and replies to the enterprise application. The enterprise application will then use this token for authentication later. Alternately, the enterprise application can generate the one-time token and pass to the mobile authentication platform.

The mobile authentication platform captures GTP Session information at the GTP-tunnels by monitoring the GTP control plane (GTP-C) information, which consists of 1) International Mobile Subscriber Identity (IMSI), 2) MSISDN, 3) uplink and downlink GTP Control Plane (GTP-C) and GTP-User Plane (GTP-U) tunnel ID, and 4) mobile device IP address.

Upon receiving enterprise application's authentication request, the mobile authentication platform looks up the GTP Session table and finds the downlink (from GGSN to SGSN) GTP-U tunnel identifier of the mobile device. Then it redirects mobile device's HTTP session by injecting a HTTP-302 response packet in this tunnel. The 302 response carries the URL (with the transaction reference, the inputted MSISDN and the one-time token as parameter) at which the enterprise application performs mobile authentication.

The enterprise application performs authentication by comparing the one-time token obtained at the mobile application API and the one embedded in mobile device's redirected HTTP request.

BRIEF DESCRIPTION OF THE DRAWINGS

For a fuller understanding of the invention, reference should be made to the following detailed disclosure, taken in connection with the accompanying drawings, in which.

DETAILED DESCRIPTION OF THE PREFERRED EMBODIMENT

Figure 1:
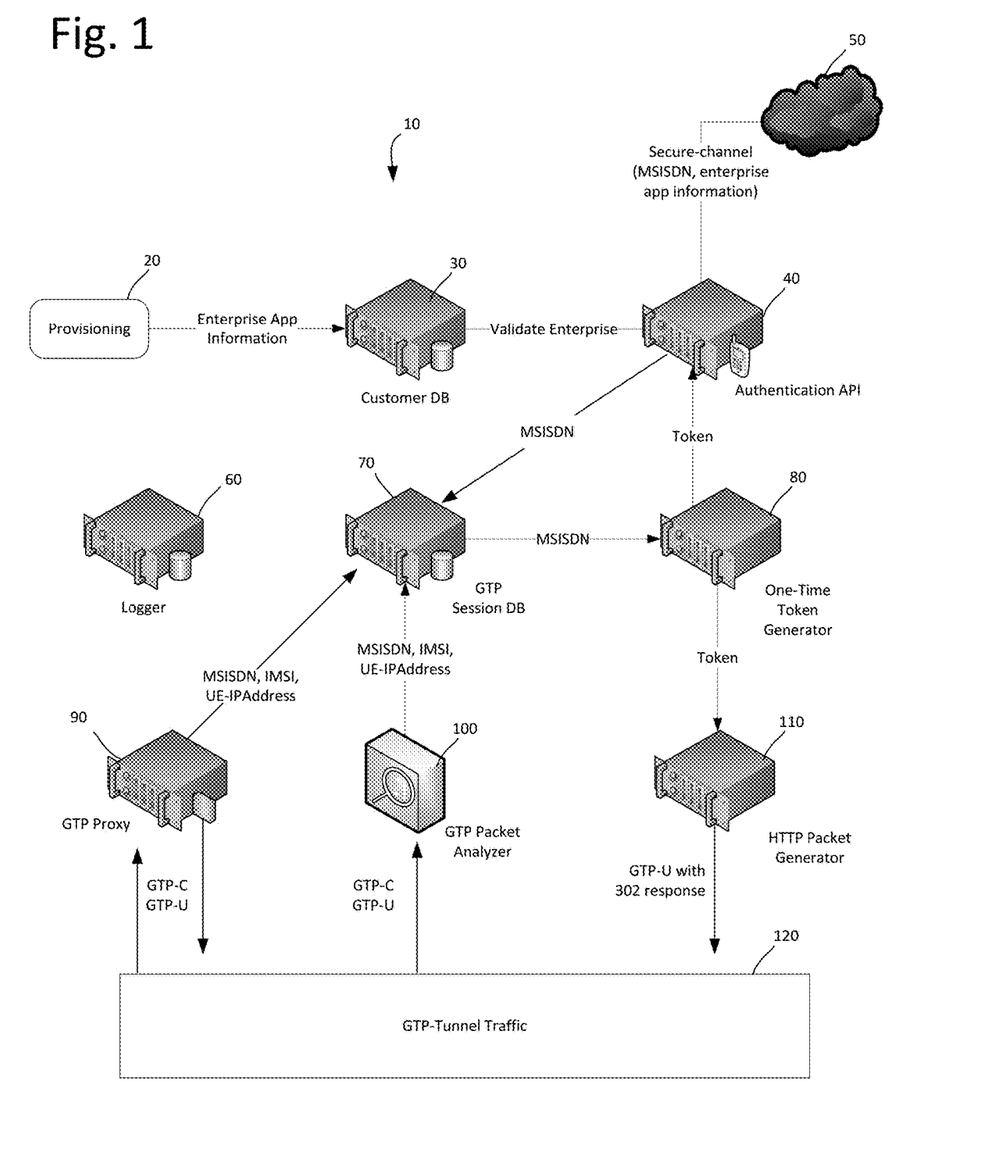
FIG. 1 is a block diagram schematically depicting the mobile authentication platform system design.

The novel structure is denoted as a whole in FIG. 1 by the reference numeral 10. In the embodiment depicted in FIG. 1, the present invention, Mobile Authentication Platform, is a specialized networking and application system that provides API for enterprise applications to perform mobile authentication, generate one-time token for authentication, captures and handles GTP data either in inline or passive mode, and injects HTTP-302 response packet to downlink GTP-U tunnel.

mobile authentication platform includes a provisioning module 20 for enterprise customer service provisioning, a customer database 30 for storing enterprise customer information, an authentication API 40 for enterprise application to perform authentication, a logger 60 for logging system and application messages and events, a GTP Session memory table or database 70 for storing online mobile device PDP information, a one-time token generator 80 to generate one-time token for authentication, a GTP-Proxy 90 to proxy GTP-C and GTP-U packets in inline mode, a GTP packet analyzer 100 to capture and decode GTP-C and GTP-U packets in passive mode, and a HTTP packet generator 110 to generate and inject HTTP-302 response.

Figure 2:
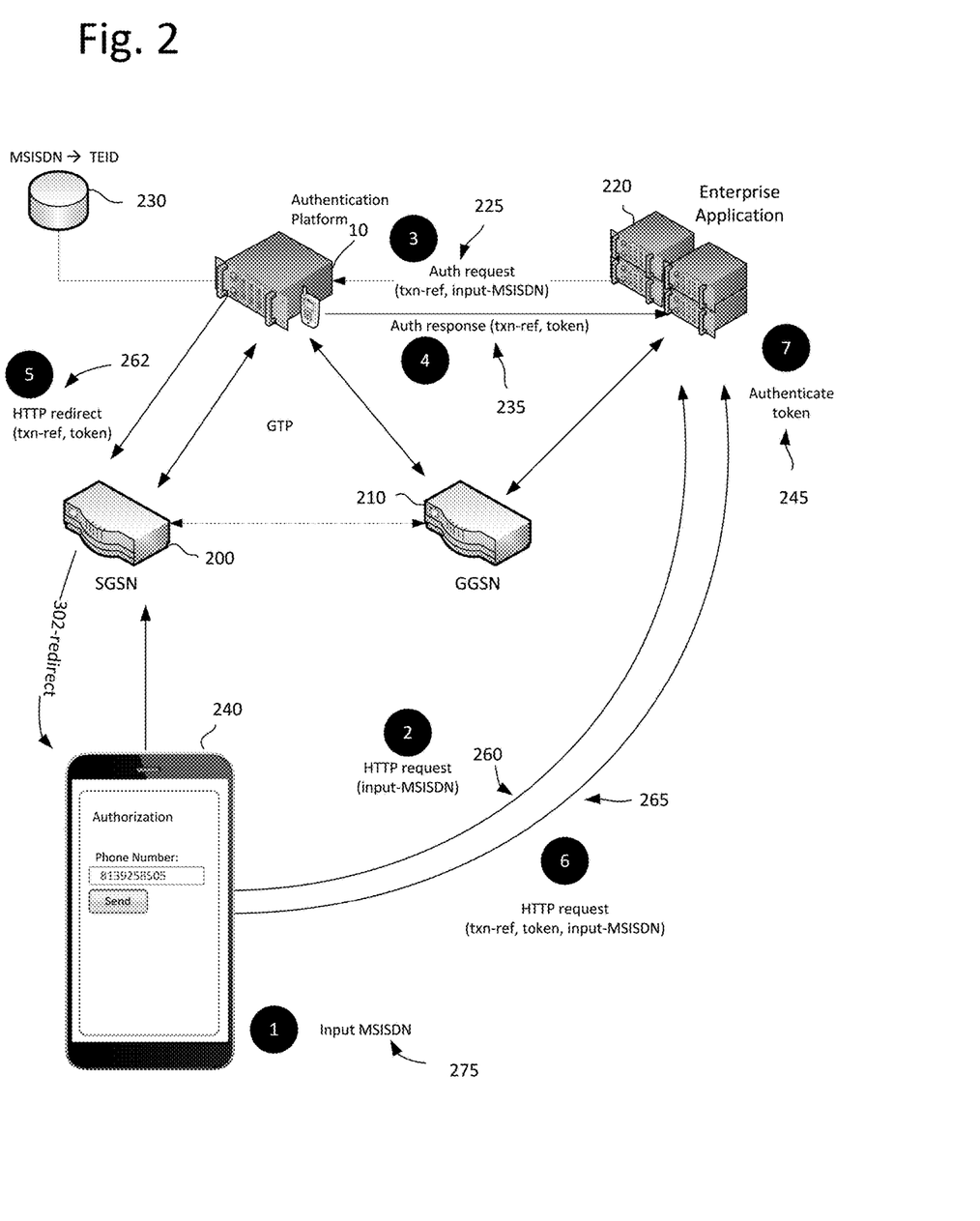
FIG. 2 is a block diagram schematically depicting the mobile authentication flow.

In the embodiment depicted in FIG. 2, the mobile authentication process begins when a user inputs MSISDN 275 on the mobile phone application or web application 240. A HTTP request 260 that carries the inputted-MSISDN is sent to the enterprise application 220.

Enterprise application 220 wants to authenticate if the inputted MSISDN 275 is legitimate. That is, whether the mobile phone that sent the HTTP request 260 is indeed carrying the inputted MSISDN 275 as its phone number. Enterprise application 220 does not send a response to this HTTP request 260. Instead, Enterprise application 220 sends an authentication request 225 to the mobile authentication platform 10. This request can be sent in a secure channel such as HTTPS with TLS or via a Virtual Private Network (VPN). This request carries the following information:
1) Enterprise application information (such as its customer identity);
2) A client certificate issued by the mobile authentication platform 10 and is stored in enterprise application 220;
3) A transaction reference number (txn-ref) that uniquely identifies the authentication request;
4) Inputted MSISDN 275;
5) Enterprise application 220 IP address and destination port where the HTTP request 260 was sent to;
6) Mobile device 240 IP address and source port where the HTTP request 260 was sent from;
7) URL of the authentication page where the mobile device 240 HTTP client shall be redirected to; and
8) Optionally, a one-time authentication token 245.

Upon receiving the authentication request 225, the mobile authentication platform 10 first validates the legitimacy of the enterprise application 220. This can be done by validating the client certificate. Then it looks up the inputted MSISDN 275 in its GTP session table. If it is not found, the request is rejected.

The mobile authentication platform then generates a one-time token 245 that is long enough to avoid brute-attack and sends it to the enterprise application 220 as response 235. Since the communication channel between the enterprise application 220 and the mobile authentication platform 10 is secure (such as protected by HTTPS), there is no risk of eavesdropping.

In other embodiments, the enterprise application 220 may generate the one-time token 245 and pass to mobile authentication platform 10 in the authentication request 225. The mobile authentication platform 10 will then use this one-time token 345 in the HTTP-302-response 262.

The mobile authentication platform 10 maps the inputted MSISDN 275 to the tunnel endpoint identifier 230 in the GTP session so the HTTP redirect 262 can be sent through the SGSN 200 back to the mobile device 240. The mobile authentication platform 10 then generates a HTTP-302-response 262 packet embedded with GTP-U header and inserts it in the downlink GTP-U tunnel towards SGSN. This HTTP-302 response packet 262 is constructed such that it matches the TCP sequence of the TCP connection between mobile device 240 and the enterprise application server 220. The tunnel-ID of the downlink GTP-U tunnel is extracted from the GTP session table 70 in the mobile authentication platform 10. The HTTP-302 response 262 contains the redirected-URL to redirect the mobile device to the designated URL provided by the enterprise application 220 during its authentication request 225. Also included in the HTTP-302 response are the ULR-parameters that include the transaction reference number (txn-ref), inputted MSISDN 275 and the one-time token 245.

Upon receiving the HTTP-302 response, the mobile device 240 browser or client application will be redirected and submits a HTTP request 265 to the new URL in the HTTP-302 response 262, and carries the transaction reference number, inputted MSISDN 275 and the one-time token 245 as HTTP request parameters. Note that this redirected HTTP request 265 can be submitted as HTTPS to avoid eavesdropping.

Upon receiving the new HTTP request 265 from mobile device 240, the enterprise application 220 validates this request 265 which comprises of the transaction reference number, inputted-MSISDN 275 and one-time-token 245. Using the transaction reference number as key, the enterprise application 220 looks up the list of pending authentication requests and compares the one-time-token in the HTTP request 265 against the one-time token 245 returned by the mobile authentication platform 10 at its authentication response 365. If they are the same, the authentication is considered successful. Otherwise, the authentication is considered failed.

Figure 3:
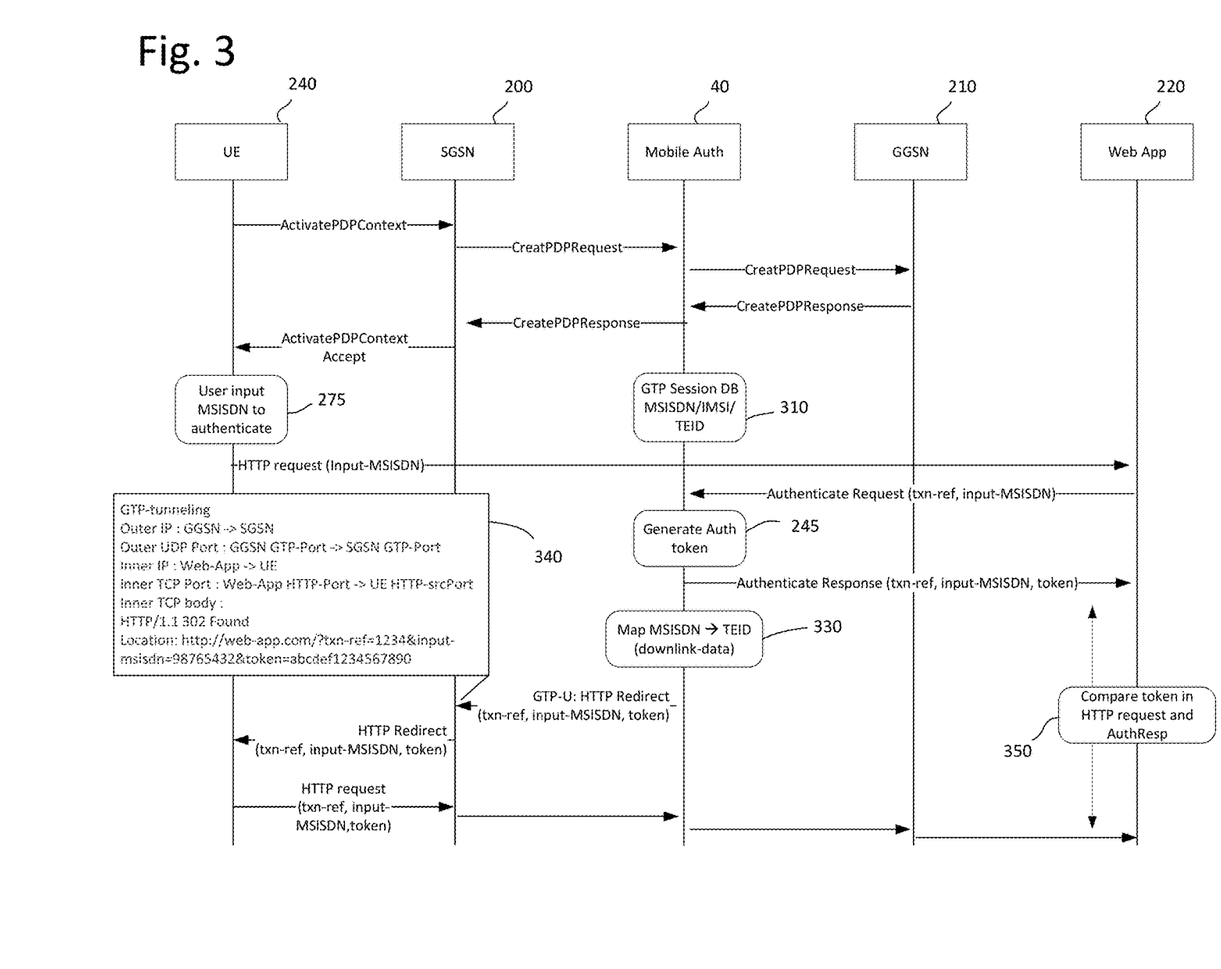
FIG. 3 is a sequential diagram schematically depicting the mobile authentication flow when the mobile authentication platform is deployed in an inline mode at GTP tunnels.

In the embodiment depicted in FIG. 3, the mobile authentication platform 10 acts as an inline GTP Proxy 90 which proxies all GTP-C and GTP-U messages between SGSN 200 and GGSN 210. The mobile authentication platform 10 acts as a GGSN towards the SGSN 200, and acts as a SGSN towards the GGSN 210. All GTP messages are terminated at this proxy. By proxying all GTP-C messages, the mobile authentication platform 10 captures and stores all GTP Session (PDP context) information in its memory including the IMSI, MSISDN, uplink and downlink tunnel-ID for both GTP-C and GTP-U planes. This information is mainly extracted from the CreatePDPRequest and CreatePDPResponse messages in GTPv1 and CreateSessionRequest and CreateSessionResponse in GTPv2 protocols. By proxying all GTP-U messages, the mobile authentication platform 10 can extract the TCP sequence number for any HTTP/TCP connection between a mobile device 240 and the enterprise application 220. When the mobile authentication platform 10 needs to send a HTTP-302 response to mobile device 240, it simply constructs the packet and sends it to the SGSN 200 in the downlink GTP tunnel as a regular GTP-U packet for that mobile device 240 (mapped by MSISDN). As previously referenced in FIG. 2, the UE 240 accepted user input of a MSISDN to authenticate 275. This is sent as an HTTP request to web app 220. A transaction reference is generated at web app 220 which is then sent to mobile authentication API 40 which has access to the GTP session data including MSISDN, IMSI and tunnel endpoint ID of the connection 310. An authorization token 245 is generated and passed to the web app 220. Authentication API 40 maps the MSISDN to the tunnel endpoint ID (downlink-data) 330 and injects the HTTP redirect 340 including the transaction reference, input-MSISDN and the token. When the UE 240 executes the redirect back to web app 220 it passes the transaction reference, input-MSISDN and token value as parameters in an HTTP or HTTPS request. The final authentication occurs when then token value of redirect parameter is compared to the token value at the web app 220 obtained in step 245.

Figure 4:
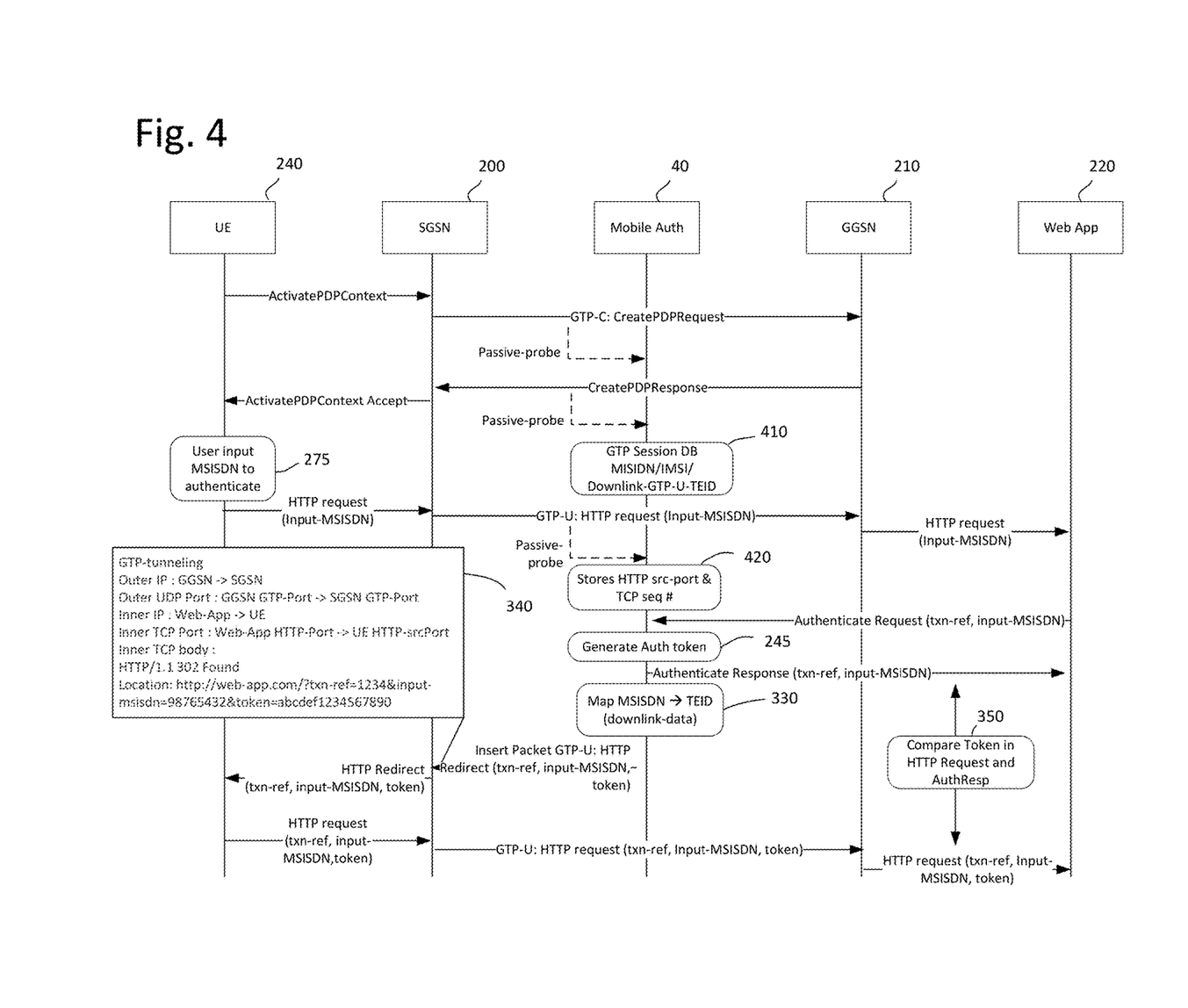
FIG. 4 is a sequential diagram schematically depicting the mobile authentication flow when the mobile authentication platform is deployed in a passive mode at GTP tunnels.

In the embodiment depicted in FIG. 4, the mobile authentication platform 10 acts as a passive box which listens to all GTP-C and GTP-U messages between SGSN 200 and GGSN 210. These messages can be extracted from the network using common 'packet mirror' features in network switches such as 'port mirror' or 'port spanning.' Note that in this deployment mode, all GTP messages are exchanged between SGSN 200 and GGSN 210 without terminating at the mobile authentication platform 10. By listening to all GTP-C messages, the mobile authentication platform 10 captures and stores all GTP Session information in its memory including the IMSI, MSISDN, uplink and downlink tunnel-ID for both GTP-C and GTP-U planes. This information is mainly extracted from the CreatePDPRequest and CreatePDPResponse messages in GTPv1 and CreateSessionRequest and CreateSessionResponse in GTPv2 protocols. By listening to all GTP-U messages, the mobile authentication platform can extract the TCP sequence number for any HTTP/TCP connection between a mobile device and the Enterprise application. When the mobile authentication platform needs to send a HTTP-302 response to mobile device 240, it simply constructs the packet and sends it to the network switch that can route the packet to SGSN 200.

Figure 5:
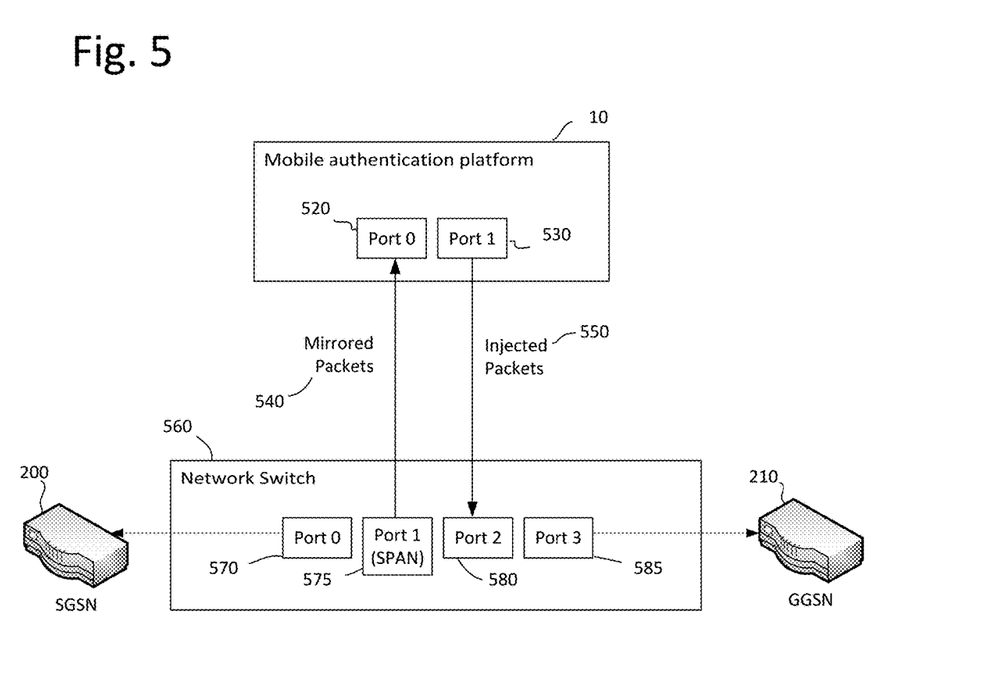
FIG. 5 is a block diagram schematically depicting the network switch configuration for passive mode deployment of Mobile Authentication Platform.

In the embodiment depicted in FIG. 5, the network switch configuration to support mobile authentication passive deployment mode is shown. The network switch 560 has 4 ports, which are:
1) Port-0 570 connected to SGSN 200 (or intermediate-hub towards SGSN);
2) Port-1 575 acting as Switched Port Analyzer (SPAN) port to send mirrored packets to mobile authentication platform 10;
3) Port-2 580 connected to mobile authentication platform 10 to receive its HTTP-302 response packets; and
4) Port-3 585 connected to GGSN 210 (or intermediate-hub towards GGSN).

Figure 6:
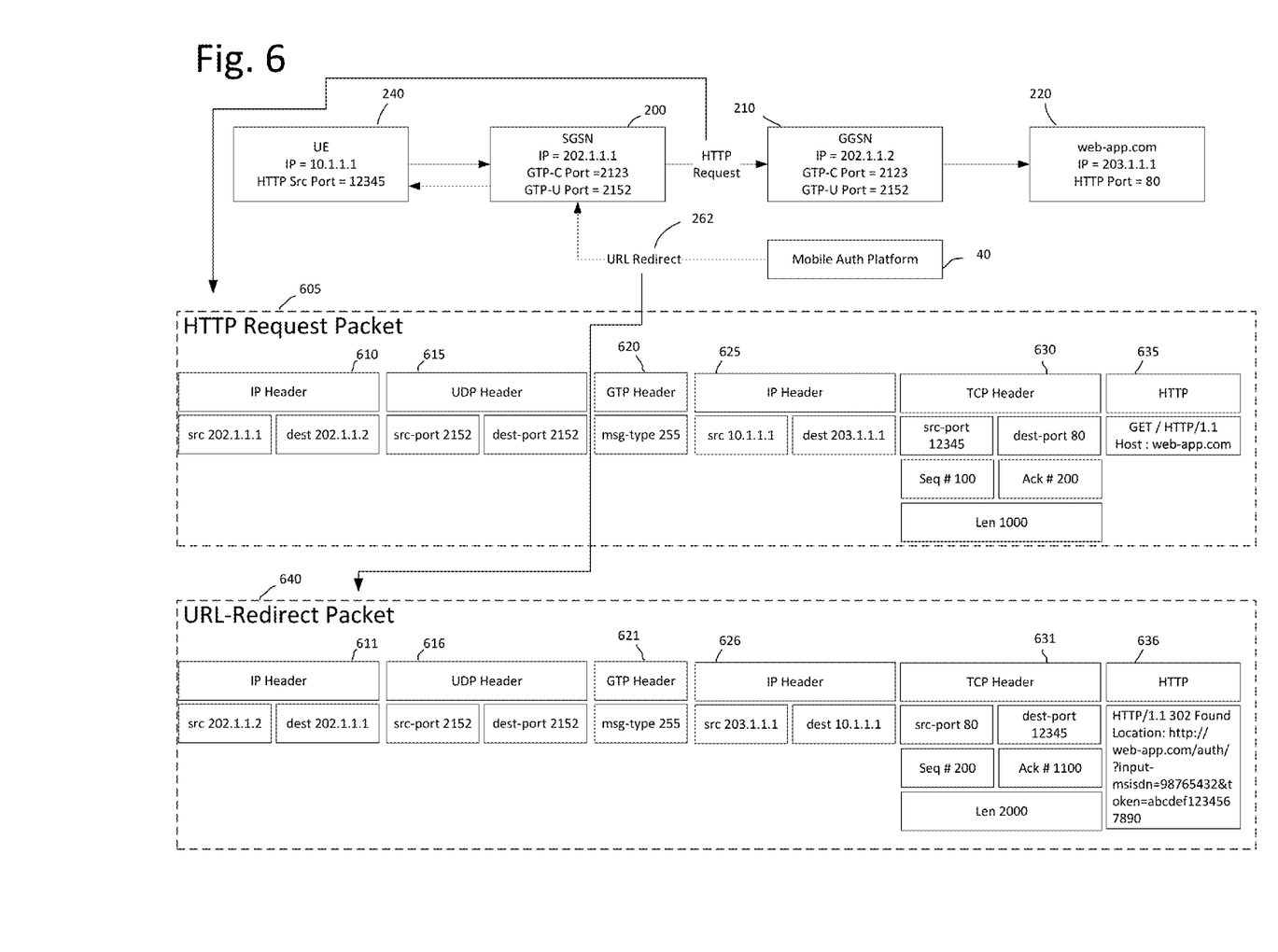
FIG. 6 is a block diagram schematically depicting the message structure and content of the HTTP request and 302 response packets.

In the embodiment depicted in FIG. 6, the structure and format of a HTTP request packet 605 and HTTP-302 response packet 640 embedded in GTP-U header is shown. In both packets, the format is (starting from the beginning):
1) An 'outer' IP header 610 (ethernet headers are skipped here) to indicate packet sending from SGSN to GGSN (for HTTP request), or from GGSN to SGSN (for HTTP response);
2) A UDP header 615 that contains the source and destination port;
3) GTP header 620 to indicate it is a GTP-U packet (message-type=255);
4) An 'Inner' IP header 625 to indicate packet sending from mobile device 240 to enterprise application 220 (web-app.com) (for HTTP request), or from enterprise application 220 to mobile device 240 (for HTTP response);
5) A TCP Header 630 to indicate the source and destination port. It also carries the TCP sequence number and ACK number for TCP sequencing and acknowledgement; and
6) HTTP request or response header 635 followed by body.

In the embodiment depicted in FIG. 6, the TCP sequence number in the TCP header 631 of the URL-redirect packet 640 is set to the value of 'TCP acknowledgement number (value of '200' in the diagram)' in the HTTP request packet so that the HTTP client's TCP stack will accept the packet without out-of-sequence error.

The TCP Acknowledgement (ACK) number in the TCP header 631 of the URL-redirect packet is set to the value of 'TCP Sequence number (value of '100' in the diagram)' plus 'TCP segment length (value of '1000' in the diagram)' in the HTTP request packet 605 (equals to value of '1100' in the diagram) so that the HTTP client's TCP stack will accept the packet without out-of-sequence error.

Hardware and Software Infrastructure Examples

The present invention may be embodied on various platforms. The following provides an antecedent basis for the information technology that may be utilized to enable the invention.

Embodiments of the present invention may be implemented in hardware, firmware, software, or any combination thereof. Embodiments of the present invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

The machine-readable medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any non-transitory, tangible medium that can contain, or store a program for use by or in connection with an instruction execution system, apparatus, or device.

A machine-readable signal medium may include a propagated data signal with machine-readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a computer readable storage medium and that can communicate, propagate, or transport a program for use by or in connection with an instruction execution system, apparatus, or device. However, as indicated above, due to circuit statutory subject matter restrictions, claims to this invention as a software product are those embodied in a non-transitory software medium such as a computer hard drive, flash-RAM, optical disk or the like.

Program code embodied on a machine-readable medium may be transmitted using any appropriate medium, including but not limited to wireless, wire-line, optical fiber cable, radio frequency, etc., or any suitable combination of the foregoing. Machine-readable program code for carrying out operations for aspects of the present invention may be written in any combination of one or more programming languages, including an object-oriented programming language such as Java, C#, C++, Visual Basic or the like and conventional procedural programming languages, such as the "C" programming language or similar programming languages.

Glossary of Terms

API stands for Application Programming Interface. An API is software that another application program employs to request and carry out lower level functions performed by an operating system or a software application. An API provides a uniform way to access functions, methods and procedures in another software system (either remote or local) by abstracting the underlying implementation and only exposing objects or actions the developer needs.

Authentication mediator means a software application service communicatively coupled between the mobile device to be authenticated and the mobile operator to which the mobile device subscribes.

Enterprise Application means computer software typically used to meet the needs of an organization rather than an individual user.

GTP means GPRS Tunneling Protocol, defined by 3GPP standards to carry General Packet Radio Service (GPRS) within 3G/4G networks.

GTP-C means a protocol within GTP for signaling between gateway GPRS support nodes (GGSN) and serving GPRS support nodes (SGSN). This allows the SGSN to activate a session on a user's behalf (PDP context activation), to deactivate the same session, to adjust quality of service parameters, or to update a session for a subscriber who has just arrived from another SGSN.

GTP-U means GTP user plane which is used for carrying user data within the GPRS network and between the core network and radio access network. The transport of user data in GTP-U is packetized in formats such as IPv4, IPv6 and PPP.

HTTP means request-response application protocol which is the foundation of the World Wide Web in a client-server computing model.

HTTP Redirect means a response under the HTTP protocol used by the World Wide Web. The response begins with an integer "3" that causes the client browser to display a different page. Different status codes are used by clients to understand the purpose of the redirect, how to handle caching and which request method to use for the subsequent request under RFC 7231.

IMSI means International Mobile Subscriber Identity. It is a specification used to uniquely identify a subscriber to a mobile telephone service. It is used internally to a GSM network and is adopted on nearly all cellular networks. The IMSI is a 50-bit field which identifies the phone's home country and carrier and is usually fifteen digits. This 15-digit number has two parts. The first part is comprised of six digits in the North American standard and five digits in the European standard. It identifies the GSM network operator in a specific country where the subscriber holds an account. The second part is allocated by the network operator to uniquely identify the subscriber. For GSM, UMTS and LTE network, this number is provisioned in the SIM card and for CDMA2000 in the phone directly or in the R-UIM card (the CDMA2000 analogue to a SIM card for GSM).

Mobile Authentication means is the verification of a user's identity through the use a mobile device and one or more authentication methods for secure access. Mobile authentication may be used to authorize the mobile device itself or as a part of a multifactor authentication scheme for logging into secure locations and resources.

Mobile device is a portable computing device connected to a wireless network such as a cellular phone, smart phone, or tablet device.

Mobile Operator (or MNO) means a wireless service provider, cellular company, wireless carrier, or mobile network carrier. An MNO is a provider of wireless communication services. The MNO owns or controls substantially all the elements necessary to sell and deploy services to customer subscribers including radio spectrum allocation, wireless network infrastructure, back haul infrastructure, customer care, billing, provisioning computer systems, marketing and repair departments.

MSISDN means Mobile Station International Subscriber Directory Number which is provisioned to a mobile device subscriber for making calls. It is the mapping of the telephone number to the SIM card (or CDMA2000 directly in the hardware) in a mobile or cellular phone and is the number normally dialed to connect a call to the mobile device. A SIM card has a unique IMSI that does not change but the MSIDN can change in time (e.g., telephone number portability).

One-Time Password (OTP Token) means a single-use password or PIN passcode. One-time password tokens are used as a part of two-factor and multifactor authentication. The OTP token may be generated synchronously using a secret key and time to create the password.

PDP means packet data protocol which is a data structure on both the server GPRS support node (SGSN) and the gateway GPRS support node (GGSN) which includes the mobile device subscriber's session data during an active session. The data recorded in the PDP structure includes the subscriber's IP address, IMSI, tunnel endpoint ID at the GGSN and tunnel endpoint ID at the SGSN.

Port Mirroring (also known as SPAN—switched port analyzer) is a method of monitoring network traffic. With port mirroring enabled, the switch sends a copy of all network packets seen on one port (or an entire VLAN) to another port, where the packet can be analyzed.

Proxy means a server (a computer system or an application) that acts as an intermediary for requests from clients seeking resources from other servers.

SGSN means server or serving GPRS support node. The SGSN is a main component of the GPRS network, which handles all packet switched data within the network, e.g. the mobility management and authentication of the users SIM (subscriber identity module) is an integrated circuit that stores the IMSI number, its related key and additional data.

SMS stands for short message service and uses standardized communication protocols to enable mobile devices to exchange short text messages.

SSL means secure sockets layer which has been deprecated in favor of transport layer security (TLS). TLS and SSL provide privacy and data integrity between two or more communicating computer applications.

TCP means transmission control protocol which is one of the primary protocols of the Internet. TCP provides robust, ordered and error-checked delivery of a stream of bytes between applications running on hosts connected via an IP network.

TCP Port means an endpoint of communication in computer networking. For software systems, the port is a logical construct that represents a specific process or type of a network service (e.g., SMTP, HTTP, HTTPS).

Token (software) is a type of two-factor authentication either with a cryptographic shared secret or public-key architecture.

Tunnel Endpoint Identifier (TEID) is a 32-bit field used to multiplex different connections in the same GTP tunnel. The GPRS tunneling protocol (GTP) stack assigns a unique tunnel endpoint identifier (TEID) to each GTP control connection (GTP-C) to the peers. The GTP stack also assigns a unique TEID to each GTP user connection (bearer) (GTP-U) to the peers.

URL means uniform resource locator which is a reference to a web resource that specifies its location on a computer network and a mechanism for retrieving it.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by machine-readable program instructions.

The advantages set forth above, and those made apparent from the foregoing disclosure, are efficiently attained. Since certain changes may be made in the above construction without departing from the scope of the invention, it is intended that all matters contained in the foregoing disclosure or shown in the accompanying drawings shall be interpreted as illustrative and not in a limiting sense.

What is claimed is:

1. A method of mobile authentication, the method comprising the steps of:
   receiving an alleged mobile station international subscriber directory number (MSISDN) value from a mobile device connected to a remote server application over a hypertext transfer protocol (HTTP) request within a general packet radio service tunneling protocol (GTP) uplink tunnel;
   retrieving GTP session data for the alleged MSISDN received from the remote server application for the mobile device connection;
   verifying the alleged MSISDN value exists in the retrieved GTP session data;
   generating a cryptographic token value accessible by the remote server application;
   saving the token value, the alleged MSISDN value and the GTP session data in a data store; and
   injecting an HTTP redirect response within a GTP downlink tunnel associated with the alleged MSISDN, the response including the token value as a uniform resource locator (URL) parameter wherein the redirect causes the mobile device to initiate another connection to the remote server application which is communicatively coupled to the data store, wherein the token value is retrieved from the new redirected connection URL parameter and evaluated against the token value in the data store whereby the alleged MSISDN value is authenticated as valid should the token value in the data store and URL parameter match.

2. The method of claim 1 wherein the redirected connection URL is over hypertext transfer protocol secure (HTTPS).

3. The method of claim 1 wherein the cryptographic token is a one-time password.

4. The method of claim 1 wherein the HTTP request from the mobile device and the HTTP redirect response each have a transmission control protocol (TCP) sequence, the method further comprising the step of constructing the redirect response so that its TCP sequence matches that of the TCP sequence of the connection from the mobile device to the remote server.

5. The method of claim 1 wherein a transaction identification value is assigned to HTTP request over the GTP tunnel with the alleged MSISDN received by the remote server, the transaction identification value is passed back as the URL parameter in the redirect response.

6. The method of claim 1 wherein the GTP session data is obtained from CreatePDPSession and CreatePDPResponse messages for GTP version 1 (GTPv1) protocols.

7. The method of claim 1 wherein the GTP session data is obtained from CreateSessionRequest and CreateSessionResponse messages for GTP version 2 (GTPv2) protocols.

8. The method of claim 1 further comprising the step of capturing and decoding GTP-C and GTP-U packets in passive mode with a GTP packet analyzer.

9. The method of claim 1 further comprising the step of capturing GTP-C messages by port-mirroring network switches.

10. The method of claim 1 further comprising the step of capturing GTP-U messages by port-mirroring network switches.

11. The method of claim 1 further comprising the step of deploying a GTP proxy server for obtaining GTP session data including GTP-C and GTP-U packets.

12. A method of mobile authentication, the method comprising the steps of:
    receiving an alleged mobile station international subscriber directory number (MSISDN) value from a mobile device connected to a remote server application over a hypertext transfer protocol (HTTP) request within a general packet radio service tunneling protocol (GTP) uplink tunnel, the mobile device communicatively coupled to an enterprise application;
    sending an authentication request from the enterprise application to an authentication platform, the authentication request including a transaction reference value and the alleged MSISDN value;
    the authentication platform retrieving GTP session data for the alleged MSISDN received from the remote server application for the mobile device connection and verifying the alleged MSISDN value exists in the retrieved GTP session data, wherein, upon verification, a cryptographic token value is generated;
    saving the token value, alleged MSISDN value and GTP session data in a data store communicatively coupled to the authentication platform and passing an authentication response from the authentication platform to the enterprise application, the authentication response including the transaction reference value and the token value;

the mobile authentication platform injecting an HTTP redirect response within a GTP downlink tunnel associated with the alleged MSISDN, the response including the transaction reference value, token value and alleged MSISDN value as uniform resource locator (URL) parameters to the mobile device wherein the redirect causes the mobile device to initiate another connection to the remote server application, wherein the token value is retrieved from the new redirected connection URL parameter and evaluated against the token value in the data store whereby the alleged MSISDN value is authenticated as valid should the token value in the data store and URL parameter match.

13. The method of claim 12 wherein the redirected connection URL is over hypertext transfer protocol secure (HTTPS).

14. The method of claim 12 wherein the cryptographic token is a one-time password.

15. The method of claim 12 wherein the HTTP request from the mobile device and the HTTP redirect response each have a transmission control protocol (TCP) sequence, the method further comprising the step of constructing the redirect response so that its TCP sequence matches that of the TCP sequence of the connection from the mobile device to the remote server.

16. The method of claim 12 further comprising the step of capturing and decoding GTP-C and GTP-U packets in passive mode with a GTP packet analyzer.

17. The method of claim 12 further comprising the step of capturing GTP-C messages by port-mirroring network switches.

18. The method of claim 12 further comprising the step of capturing GTP-U messages by port-mirroring network switches.

19. The method of claim 12 further comprising the step of deploying a GTP proxy server for obtaining GTP session data including GTP-C and GTP-U packets.

20. A method of mobile authentication, the method comprising the steps of:

receiving an alleged mobile station international subscriber directory number (MSISDN) value from a mobile device connected to a remote server application over a hypertext transfer protocol (HTTP) request within a general packet radio service tunneling protocol (GTP) uplink tunnel, the mobile device communicatively coupled to an enterprise application;

sending an authentication request from the enterprise application to an authentication platform, the authentication request including a transaction reference value and the alleged MSISDN value;

the authentication platform retrieving GTP session data for the alleged MSISDN received from the remote application server for the mobile device connection using packet mirroring in network switches conveying GTP-C and GTP-U messages between serving general packet radio service support node (SGSN) and gateway general packet radio service support node (GGSN), the messages including international mobile subscriber identity (IMSI), MSISDN, uplink tunnel ID and downlink tunnel ID for both GTP-C and GTP-U planes;

extracting from the GTP-U messages, a TCP sequence number for the HTTP connection between the mobile device and the enterprise application;

the authentication platform further verifying the alleged MSISDN value exists in the retrieved GTP session data, and mapping the MSISDN value to a tunnel endpoint identifier wherein, upon verification that the MSISDN value exists in the GTP session data, generating a cryptographic token value;

saving the token value, alleged MSISDN value and GTP session data in a data store communicatively coupled to the authentication platform and passing an authentication response from the authentication platform to the enterprise application, the authentication response including the transaction reference value and the token value;

the mobile authentication application injecting an HTTP redirect response packet with a transmission control protocol (TCP) acknowledgment number derived from the TCP sequence number previously extracted from the GTP-U messages whereby the mobile device will accept the packet without an out-of-sequence error, the HTTP redirect response sent within a GTP downlink tunnel associated with the alleged MSISDN, the response including the transaction reference value, token value and alleged MSISDN value as URL parameters to the mobile device wherein the redirect causes the mobile device to initiate another connection to the enterprise application, wherein the token value is retrieved from the new redirected connection URL parameter and evaluated against the token value in the data store whereby the alleged MSISDN value is authenticated as valid should the token value in the data store and URL parameter match.

* * * * *